US012582173B2

(12) United States Patent
Lee et al.

(10) Patent No.: US 12,582,173 B2
(45) **Date of Patent: \*Mar. 24, 2026**

(54) AEROSOL GENERATING DEVICE INCLUDING A HARVEST DEVICE

(71) Applicant: KT&G CORPORATION, Daejeon (KR)

(72) Inventors: Won Kyeong Lee, Gyeonggi-do (KR); Heon Jun Jeong, Seoul (KR); Jae Sung Choi, Gwangju (KR)

(73) Assignee: KT&G Corporation, Daejeon (KR)

( * ) Notice: Subject to any disclaimer, the term of this patent is extended or adjusted under 35 U.S.C. 154(b) by 601 days.

This patent is subject to a terminal disclaimer.

(21) Appl. No.: 17/792,190

(22) PCT Filed: Apr. 27, 2022

(86) PCT No.: PCT/KR2022/005999
§ 371 (c)(1),
(2) Date: Jul. 12, 2022

(87) PCT Pub. No.: WO2022/231293
PCT Pub. Date: Nov. 3, 2022

(65) Prior Publication Data
US 2024/0172806 A1 May 30, 2024

(30) Foreign Application Priority Data
Apr. 30, 2021 (KR) ........................ 10-2021-0056870

(51) Int. Cl.
*A24F 40/90* (2020.01)
*A24F 40/20* (2020.01)
(Continued)

(52) U.S. Cl.
CPC .............. *A24F 40/90* (2020.01); *A24F 40/20* (2020.01); *A24F 40/51* (2020.01); *A24F 40/53* (2020.01);
(Continued)

(58) Field of Classification Search
CPC ...................................................... A24F 40/90
(Continued)

(56) References Cited

U.S. PATENT DOCUMENTS 9,450,504 B2 9/2016 Mateu et al.
10,231,485 B2 3/2019 Sur
(Continued)

FOREIGN PATENT DOCUMENTS

CN 104541444 A 4/2015
CN 104584366 A 4/2015
(Continued)

OTHER PUBLICATIONS

International Search Report dated Aug. 1, 2022 in International Application No. PCT/KR2022/005999.
(Continued)

*Primary Examiner* — Yalkew Fantu
(74) *Attorney, Agent, or Firm* — Foley & Lardner LLP

(57) ABSTRACT
An aerosol-generating device includes a heating element configured to heat an aerosol-generating substrate, a battery configured to supply power to the heating element, a harvest device configured to generate power, and a controller configured to control conversion of power generated by the harvest device and control charging of the battery by using converted power.

17 Claims, 9 Drawing Sheets

(51) Int. Cl.

| | |
|---|---|
| *A24F 40/51* | (2020.01) |
| *A24F 40/53* | (2020.01) |
| *A24F 40/60* | (2020.01) |
| *H02J 7/00* | (2006.01) |
| *H02J 7/04* | (2006.01) |
| *H02J 50/00* | (2016.01) |
| *H02M 1/00* | (2006.01) |
| *H02M 3/155* | (2006.01) |
| *H02M 7/217* | (2006.01) |
| *H02M 7/219* | (2006.01) |
| *H02N 11/00* | (2006.01) |

(52) U.S. Cl.
CPC ............ *A24F 40/60* (2020.01); *H02J 7/0048* (2020.01); *H02J 7/04* (2013.01); *H02J 50/001* (2020.01); *H02M 1/007* (2021.05); *H02M 3/155* (2013.01); *H02M 7/217* (2013.01); *H02M 7/2195* (2021.05); *H02J 2207/20* (2020.01); *H02N 11/002* (2013.01)

(58) Field of Classification Search
USPC ........................................................ 320/114
See application file for complete search history.

(56) References Cited

U.S. PATENT DOCUMENTS

| | | | | |
|---|---|---|---|---|
| 10,582,726 | B2 | 3/2020 | Sur et al. | |
| 12,063,968 | B2* | 8/2024 | Lee ......................... | A24F 40/46 |
| 2013/0220315 | A1 | 8/2013 | Conley et al. | |
| 2015/0034102 | A1 | 2/2015 | Faramarzian | |
| 2015/0181942 | A1* | 7/2015 | Holzherr .......... | H02J 7/007182 |
| | | | | 131/328 |
| 2016/0336794 | A1 | 11/2016 | Hsu et al. | |
| 2017/0112196 | A1* | 4/2017 | Sur ...................... | H05B 1/0227 |
| 2017/0202266 | A1 | 7/2017 | Sur | |
| 2018/0007969 | A1* | 1/2018 | Sur ......................... | A24F 40/50 |
| 2020/0275703 | A1 | 9/2020 | Takeuchi et al. | |
| 2021/0127753 | A1 | 5/2021 | Tatsuta et al. | |
| 2021/0127757 | A1 | 5/2021 | Lee et al. | |
| 2021/0135591 | A1 | 5/2021 | Ikeda | |
| 2022/0053831 | A1 | 2/2022 | Zhu et al. | |

FOREIGN PATENT DOCUMENTS

| | | | |
|---|---|---|---|
| CN | 109689142 | A | 4/2019 |
| CN | 210988232 | U | 7/2020 |
| CN | 111920099 | A | 11/2020 |
| CN | 112534702 | A | 3/2021 |
| JP | 2016-77060 | A | 5/2016 |
| JP | 2019-537420 | A | 12/2019 |
| JP | 6706712 | B1 | 6/2020 |
| JP | 2020-521455 | A | 7/2020 |
| KR | 10-2012-0081003 | A | 7/2012 |
| KR | 10-2012-0107219 | A | 10/2012 |
| KR | 10-2017-0048949 | A | 5/2017 |
| KR | 10-2019-0039406 | A | 4/2019 |
| KR | 10-2020-0108216 | A | 9/2020 |

OTHER PUBLICATIONS

Extended European Search Report issued Jul. 3, 2023 in European Application No. 22735756.3.
Office Action issued Jul. 25, 2023 in Japanese Application No. 2022-546142.
Communication dated Mar. 28, 2023, issued in Korean Application No. 10-2021-0056870.
Chinese Office Action on CN Patent Appl. No. 202280002648.5 dated Feb. 6, 2026.

* cited by examiner

[Fig. 5]
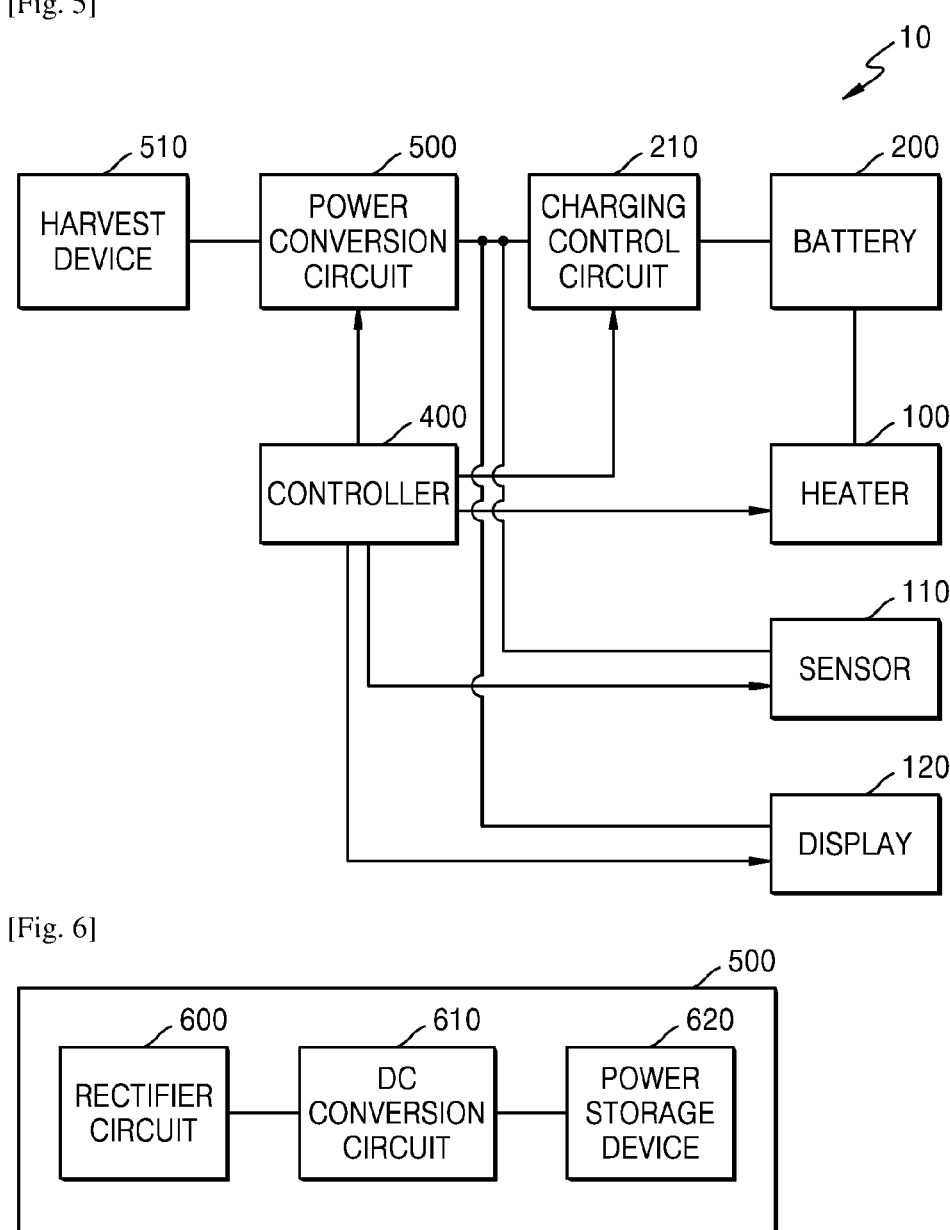
[Fig. 6]

[Fig. 7]
[Fig. 8]
[Fig. 9]
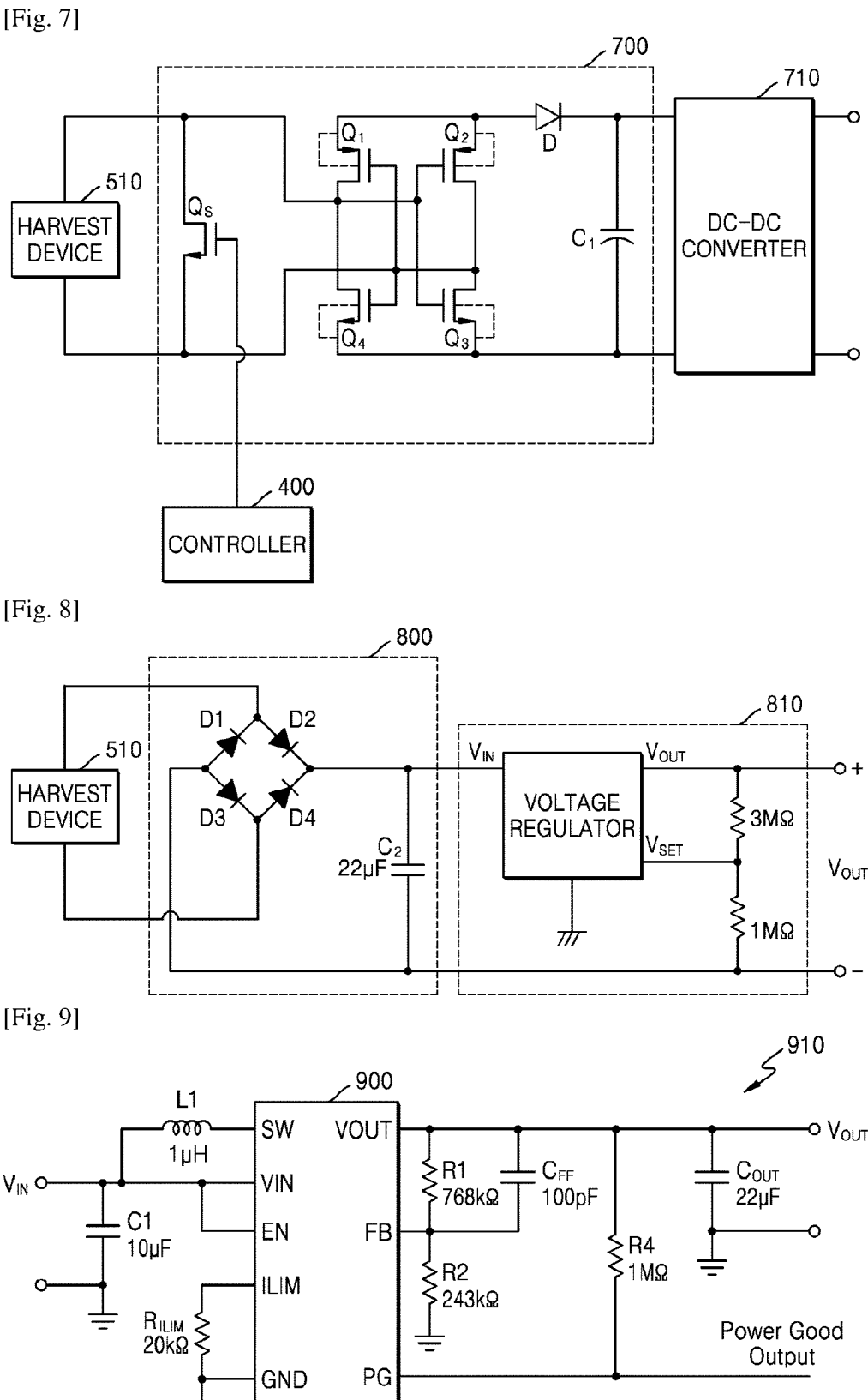

[Fig. 10]
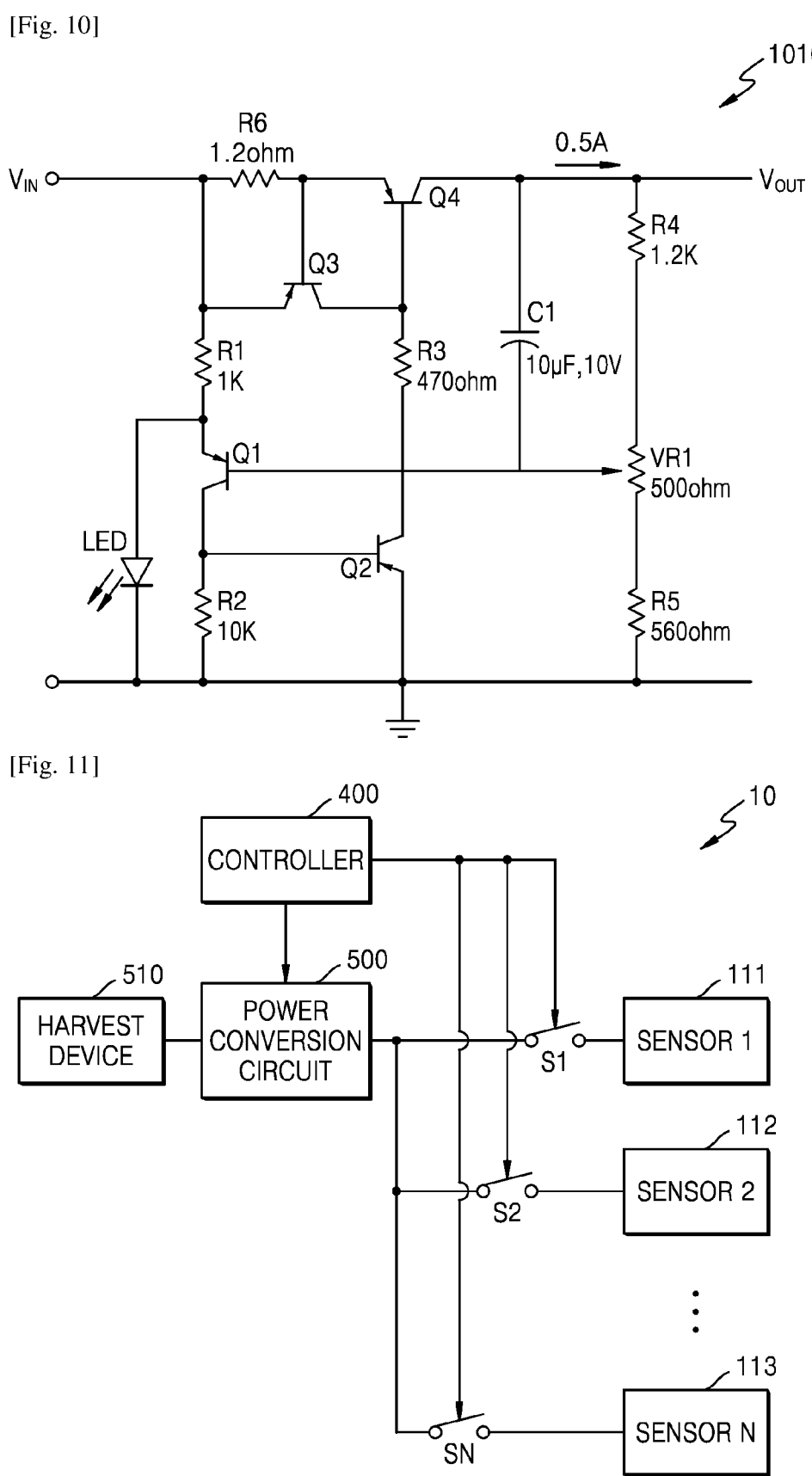
[Fig. 11]

[Fig. 12]
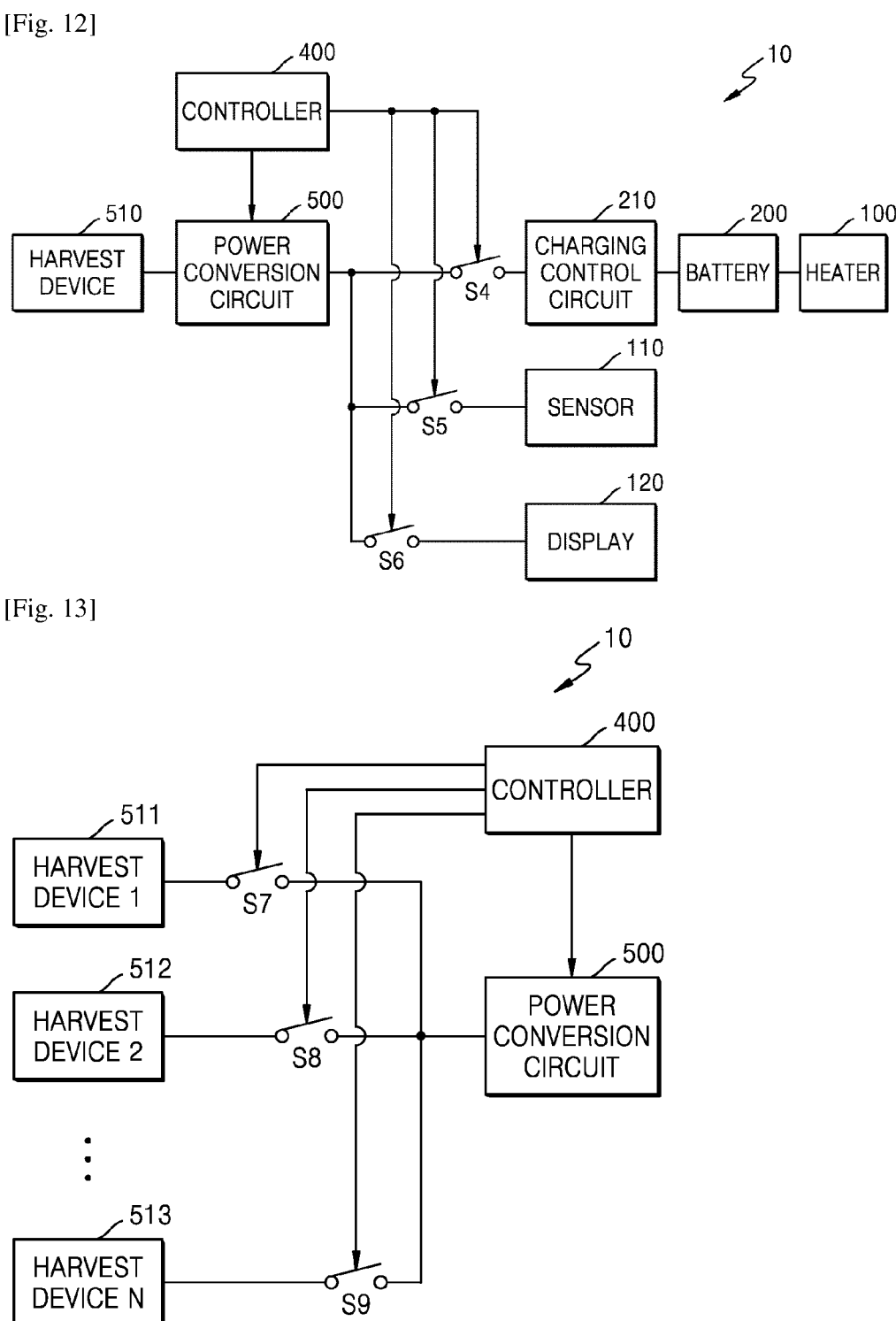
[Fig. 13]

[Fig. 14A]
[Fig. 14B]
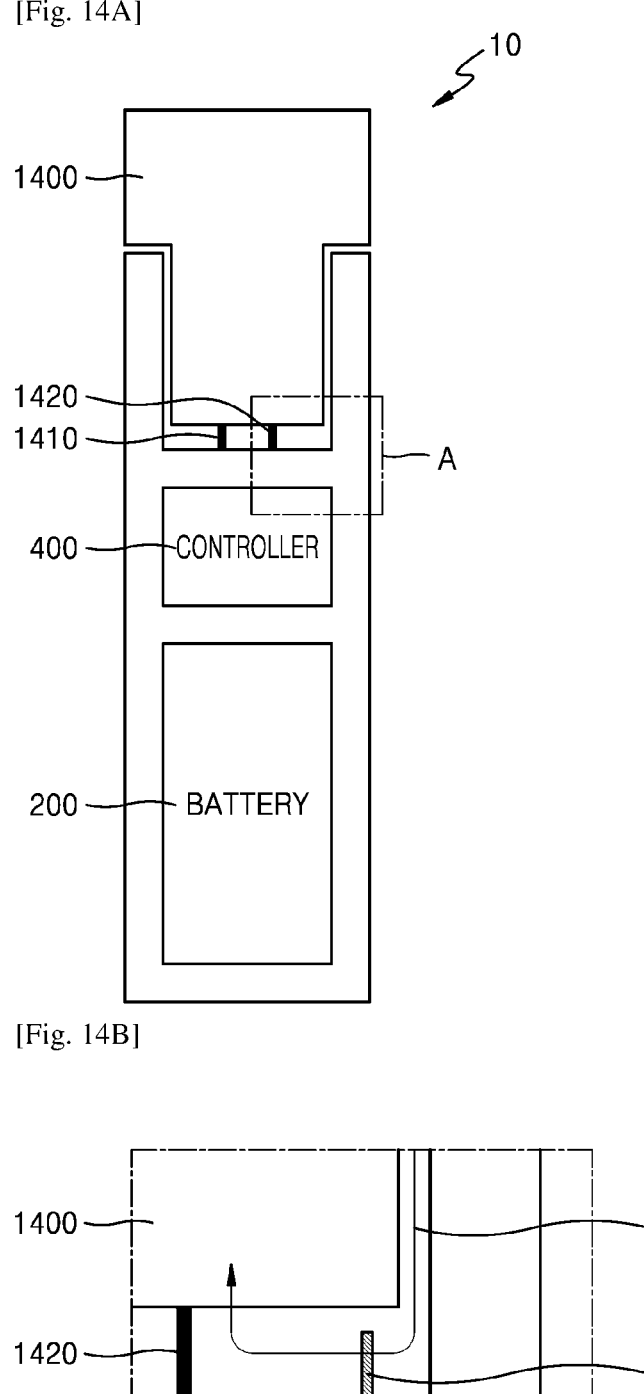

AEROSOL GENERATING DEVICE INCLUDING A HARVEST DEVICE

CROSS REFERENCE TO RELATED APPLICATIONS

This application is a National Stage of International Application No. PCT/KR2022/005999 filed on Apr. 27, 2022, claiming priority based on Korean Patent Application No. 10-2021-0056870 filed on Apr. 30, 2021.

TECHNICAL FIELD

The present disclosure relates to an aerosol-generating device, and more particularly, to an aerosol-generating device capable of recharging a battery and supplying power by using a harvest device.

BACKGROUND ART

Recently, the demand for alternative methods to overcome the shortcomings of general cigarettes has increased. For example, there has been increasing demand for aerosol generating devices that generate an aerosol by heating an aerosol-generating material in an aerosol generating substrate (e.g., cigarette) without combustion. Accordingly, studies on a heating-type cigarette or a heating-type aerosol-generating device have been actively conducted.

A general aerosol-generating device includes a heater or a vaporizer that heats an aerosol-generating product. Because a battery supplies power to the heater or the vaporizer, the battery needs to be frequently recharged. However, the capacity of a portable battery is limited, and it is difficult to frequently recharge the battery of the aerosol-generating device outdoors. Therefore, the aerosol-generating device often stops working because of a discharged battery.

DISCLOSURE OF INVENTION

Technical Problem

The technical problems to be solved by the present disclosure are to provide an aerosol-generating device which has increased energy efficiency and requires less battery charging time by recharging the battery or supplying power to components of the aerosol-generating device with power generated by a harvest device.

The technical problems of the present disclosure are not limited to the above-described description, and other technical problems may be derived from the embodiments to be described hereinafter.

Solution to Problem

An aerosol-generating device includes a heating element configured to heat an aerosol-generating substrate and generate an aerosol, a battery configured to supply power to the heating element, a harvest device arranged at a certain location of the aerosol-generating device, and a controller configured to control the conversion of power generated by the harvest device and control charging of the battery by using converted power.

Advantageous Effects of Invention

According to one or more embodiments, an aerosol-generating device may have increased energy efficiency, and require less battery charging time by recharging the battery of the aerosol-generating device or supplying the power to components of the aerosol-generating device with power generated by a harvest device arranged in the aerosol-generating device.

Effects of the disclosure are not limited to those stated above, and effects that are not mentioned may be clearly understood by one of ordinary skill in the art from the present specification and the attached drawings.

BRIEF DESCRIPTION OF DRAWINGS

FIG. 5 is a block diagram of an aerosol-generating device according to an embodiment.

FIG. 6 is an exemplary block diagram of a power conversion circuit 500 of FIG. 5.

FIG. 7 is another exemplary block diagram of the power conversion circuit 500 of FIG. 5.

FIG. 8 is another exemplary block diagram of the power conversion circuit 500 of FIG. 5.

FIG. 9 is an exemplary block diagram of a DC-DC converter 710 of FIG. 7.

FIG. 10 is another exemplary block diagram of a DC voltage regulator 810 of FIG. 8.

FIG. 11 is a block diagram of an aerosol-generating device according to another embodiment.

FIG. 12 is a block diagram of an aerosol-generating device according to another embodiment.

FIG. 13 is a block diagram of an aerosol-generating device according to another embodiment.

FIGS. 14A and 14B are block diagrams of an aerosol-generating device according to another embodiment.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
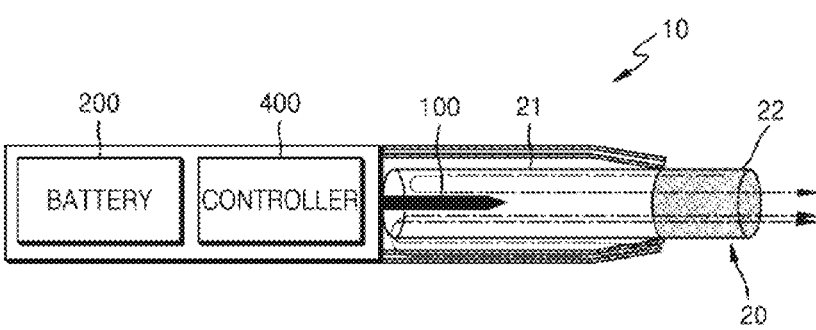
FIGS. 1 to 3 are diagrams of examples of inserting a cigarette into an aerosol-generating device.
Figure 2:
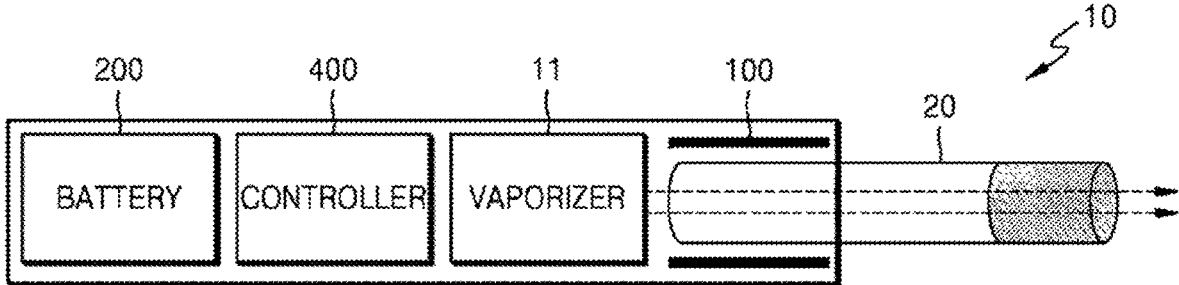
Figure 3:
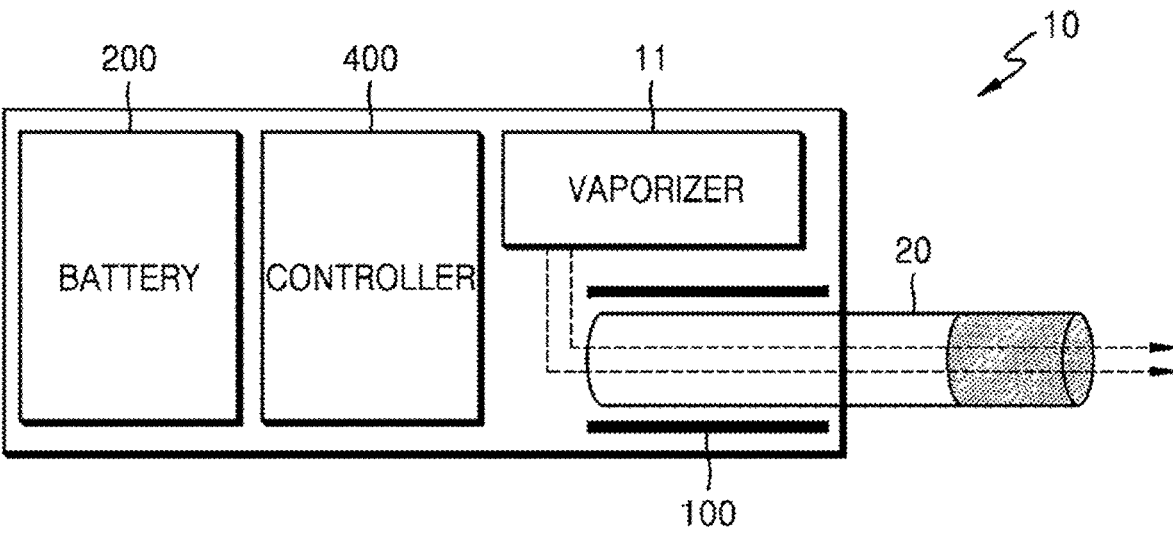

FIGS. 1 through 3 are diagrams showing examples in which a cigarette is inserted into an aerosol generating device.

Referring to FIG. 1, the aerosol generating device 10 may include a battery 200, a controller 400, and a heater 100. Referring to FIGS. 2 and 3, the aerosol generating device 10 may further include a vaporizer 11. Also, a cigarette 20 may be inserted into an inner space of the aerosol generating device 10.

FIGS. 1 through 3 illustrate components of the aerosol generating device 10, which are related to the present embodiment. Therefore, it will be understood by one of ordinary skill in the art related to the present embodiment that other general-purpose components may be further included in the aerosol generating device 10, in addition to the components illustrated in FIGS. 1 through 3.

Also, FIGS. 2 and 3 illustrate that the aerosol generating device 10 includes the heater 100. However, as necessary, the heater 100 may be omitted.

FIG. 1 illustrates that the battery 200, the controller 400, and the heater 100 are arranged in series. Also, FIG. 2 illustrates that the battery 200, the controller 400, the vaporizer 11, and the heater 100 are arranged in series. Also, FIG. 3 illustrates that the vaporizer 11 and the heater 100 are arranged in parallel. However, the internal structure of the aerosol generating device 10 is not limited to the structures illustrated in FIGS. 1 through 3. When the cigarette 20 is inserted into the aerosol generating device 100, the aerosol generating device 10 may operate the heater 100 and/or the vaporizer 11 to generate aerosol from the cigarette 20 and/or the vaporizer 11.

The aerosol generated by the heater 100 and/or the vaporizer 11 is delivered to a user by passing through the cigarette 20. As necessary, even when the cigarette 20 is not inserted into the aerosol generating device 10, the aerosol generating device 10 may heat the heater 100.

The battery 200 supplies electric power to be used for the aerosol generating device 10 to operate.

For example, the battery 200 may supply power to heat the heater 100 or the vaporizer 11, and may supply power for operating the controller 400. Also, the battery 200 may supply power for operations of a display, a sensor, a motor, etc. mounted in the aerosol generating device 10. The controller 400 may generally control operations of the aerosol generating device 10.

In detail, the controller 400 may control not only operations of the battery 200, the heater 100, and the vaporizer 11, but also operations of other components included in the aerosol generating device 10. Also, the controller 400 may check a state of each of the components of the aerosol generating device 10 to determine whether or not the aerosol generating device 10 is able to operate. The controller 400 may include at least one processor.

A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware. The heater 100 may be heated by the power supplied from the battery 200.

For example, when the cigarette 20 is inserted into the aerosol generating device 10, the heater 100 may be located outside the cigarette 20. Thus, the heated heater 100 may increase a temperature of an aerosol generating material in the cigarette 20. The heater 100 may include an electro-resistive heater.

For example, the heater 100 may include an electrically conductive track, and the heater 100 may be heated when currents flow through the electrically conductive track. However, the heater 100 is not limited to the example described above and may include any other heaters which may be heated to a desired temperature. Here, the desired temperature may be pre-set in the aerosol generating device 10 or may be set by a user. As another example, the heater 100 may include an induction heater.

In detail, the heater 100 may include an electrically conductive coil for heating a cigarette in an induction heating method, and the cigarette may include a susceptor which may be heated by the induction heater. For example, the heater 100 may include a tube-type heating element, a plate-type heating element, a needle-type heating element, or a rod-type heating element, and may heat the inside or the outside of the cigarette 20, according to the shape of the heating element.

Also, the aerosol generating device 10 may include a plurality of heaters 100.

Here, the plurality of heaters 100 may be inserted into the cigarette 20 or may be arranged outside the cigarette 20. Also, some of the plurality of heaters 100 may be inserted into the cigarette 20 and the others may be arranged outside the cigarette 20. In addition, the shape of the heater 100 is not limited to the shapes illustrated in FIGS. 1 through 3 and may include various shapes. The vaporizer 11 may generate aerosol by heating a liquid composition and the generated aerosol may pass through the cigarette 20 to be delivered to a user.

In other words, the aerosol generated via the vaporizer 11 may move along an air flow passage of the aerosol generating device 10 and the air flow passage may be configured such that the aerosol generated via the vaporizer 11 passes through the cigarette 20 to be delivered to the user. For example, the vaporizer 11 may include a liquid storage, a liquid delivery element, and a heating element, but it is not limited thereto.

For example, the liquid storage, the liquid delivery element, and the heating element may be included in the aerosol generating device 10 as independent modules. The liquid storage may store a liquid composition.

For example, the liquid composition may be a liquid including a tobacco-containing material having a volatile tobacco flavor component, or a liquid including a nonto-bacco material. The liquid storage may be formed to be detachable from the vaporizer 11 or may be formed integrally with the vaporizer 11. For example, the liquid composition may include water, a solvent, ethanol, plant extract, spices, flavorings, or a vitamin mixture.

The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol. The liquid delivery element may deliver the liquid composition of the liquid storage to the heating element.

For example, the liquid delivery element may be a wick such as cotton fiber, ceramic fiber, glass fiber, or porous ceramic, but is not limited thereto. The heating element is an element for heating the liquid composition delivered by the liquid delivery element.

For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated. For example, the vaporizer 11 may be referred to as a cartomizer or an atomizer, but it is not limited thereto.

The aerosol generating device 10 may further include general-purpose components in addition to the battery 200, the controller 400, the heater 100, and the vaporizer 11.

For example, the aerosol generating device 10 may include a display capable of outputting visual information and/or a motor for outputting haptic information. Also, the aerosol generating device 10 may include at least one sensor (e.g., a puff detecting sensor, a temperature detecting sensor, a cigarette insertion detecting sensor, etc.). Also, the aerosol generating device 10 may be formed as a structure that, even when the cigarette 20 is inserted into the aerosol generating device 10, may introduce external air or discharge internal air. Although not illustrated in FIGS. 1 through 3, the aerosol generating device 10 and an additional cradle may form together a system.

For example, the cradle may be used to charge the battery 200 of the aerosol generating device 10. Alternatively, the heater 100 may be heated when the cradle and the aerosol generating device 10 are coupled to each other. A cigarette 20 may be similar to a general combustive cigarette.

For example, the cigarette 20 may be divided into a first portion including an aerosol generating material and a second portion including a filter, etc. Alternatively, the second portion of the cigarette 20 may also include an aerosol generating material. For example, an aerosol generating material made in the form of granules or capsules may be inserted into the second portion. The entire first portion may be inserted into the aerosol generating device 10, and the second portion may be exposed to the outside.

Alternatively, only a portion of the first portion may be inserted into the aerosol generating device 10, or the entire first portion and a portion of the second portion may be inserted into the aerosol generating device 10. The user may puff aerosol while holding the second portion by the mouth of the user. In this case, the aerosol is generated by the external air passing through the first portion, and the generated aerosol passes through the second portion and is delivered to the user's mouth. For example, the external air may flow into at least one air passage formed in the aerosol generating device 10.

For example, opening and closing of the air passage and/or a size of the air passage formed in the aerosol generating device 10 may be adjusted by the user. Accordingly, the amount of smoke and a smoking impression may be adjusted by the user. As another example, the external air may flow into the cigarette 20 through at least one hole formed in a surface of the cigarette 20. Hereinafter, an embodiment is described in detail with reference to FIG. 4.

Figure 4:
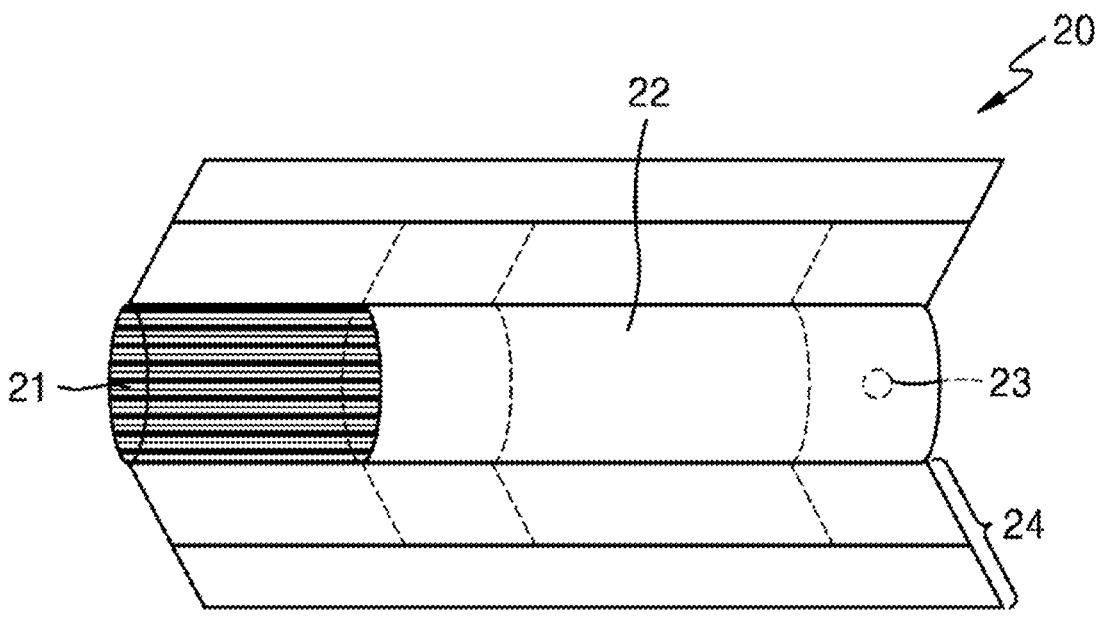
FIG. 4 illustrates an example of a cigarette.

FIG. 4 is a diagram illustrating an example of a cigarette.

Referring to FIG. 4, the cigarette 20 may include a tobacco rod 21 and a filter rod 22.

The first portion described above with reference to FIGS. 1 through 3 may include the tobacco rod 21, and the second portion may include the filter rod 22. FIG. 4 illustrates that the filter rod 22 includes a single segment, but is not limited thereto.

In other words, the filter rod 22 may include a plurality of segments. For example, the filter rod 22 may include a first segment configured to cool an aerosol and a second segment configured to filter a certain component included in the aerosol. Also, as necessary, the filter rod 22 may further include at least one segment configured to perform other functions. The cigarette 20 may be packaged by at least one wrapper 24.

The wrapper 24 may have at least one hole through which external air may be introduced or internal air may be discharged. For example, the cigarette 20 may be packaged via one wrapper 24. As another example, the cigarette 20 may be doubly packaged by two or more wrappers 24. For example, the tobacco rod 21 may be packaged via a first wrapper, and the filter rod 22 may be packaged via a second wrapper. Also, the tobacco rod 21 and the filter rod 22, which are respectively packaged via separate wrappers, may be coupled to each other, and the entire cigarette 20 may be repackaged via a third wrapper. When each of the tobacco rod 21 and the filter rod 22 includes a plurality of segments, each segment may be packaged via a separate wrapper. Also, the entire cigarette 20 including the plurality of segments, which are respectively packaged via the separate wrappers and which are coupled to each other, may be re-packaged via another wrapper. The tobacco rod 21 may include an aerosol generating material.

For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21. The tobacco rod 21 may be manufactured in various forms.

For example, the tobacco rod 21 may be formed as a sheet or a strand. Also, the tobacco rod 21 may be formed as a pipe tobacco, which is formed of tiny bits cut from a tobacco sheet. Also, the tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity applied to the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21. The filter rod 22 may include a cellulose acetate filter.

Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape. The filter rod 22 may be formed to generate flavors.

For example, a flavoring liquid may be injected onto the filter rod 22, or an additional fiber coated with a flavoring liquid may be inserted into the filter rod 22. Also, the filter rod 22 may include at least one capsule 23.

Here, the capsule 23 may perform a function of generating flavor or a function of generating aerosol. For example, the capsule 23 may have a configuration in which a liquid containing a flavoring material is wrapped with a film. For example, the capsule 23 may have a spherical or cylindrical shape, but is not limited thereto. When the filter rod 22 includes a segment configured to cool the aerosol, the cooling segment may include a polymer material or a biodegradable polymer material.

For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol. Although not illustrated in FIG. 4, the cigarette 20 according to an embodiment may further include a front-end filter.

The front-end filter is located on an upstream end of the tobacco rod 21 that is opposite to its downstream end where the filter rod 22 is connected. The front-end filter may prevent the tobacco rod 21 from being falling off and prevent a liquefied aerosol from flowing into the aerosol generating device 10 (FIGS. 1 through 3) from the tobacco rod 21, during smoking. FIG. 5 is a block diagram of an aerosol-generating device 10 according to an embodiment.

Referring to FIG. 5, the aerosol-generating device 10 may include the heater 100, the battery 200, and the controller 400, which are described above with respect to FIGS. 1 to 3. Also, the aerosol-generating device 10 may include a harvest device 510 for energy harvesting, a power conversion circuit 500, and a charging control circuit 210 for controlling the charging of the battery 200.

Also, the aerosol-generating device 10 may include the sensor 110 and the display 120. Here, the descriptions regarding the components described with reference to FIGS. 1 to 3 are omitted, and a configuration of the energy harvesting, a combination of structures of the aerosol-generating device 10, and various embodiments are mainly described. Energy harvesting is a technology that collects and uses environmental energy around a device and natural energy such as sun and wind. A harvesting device may reproduce energy by harvesting or scavenging energy from resources that are discarded or not used, and energy produced is in a range of about microwatts ((W) to milliwatts (mW).

Energy harvesting may be variously classified according to methods of obtaining energy. Examples of energy harvesting from nature include a solar cell method of obtaining energy from solar power, a thermoelectric method of obtaining electrical energy from heat, a piezoelectric method of obtaining electrical energy from vibration, and an RF method of obtaining energy from electromagnetic waves. The harvest device 510 collects power from energy sources generated from different locations of the aerosol-generating device 10.

In an embodiment, the harvest device 510 may be of a piezoelectric type, a thermoelectric type, a photoelectric type, an electromagnetic type, or a fan type. For example, the harvest device 510 may be a thermoelectric device arranged around the heater 100 of the aerosol-generating device 10, an electromagnetic device arranged around an antenna (not illustrated) receiving an RF, or a fan-type device arranged in an airflow passage through which external air is introduced to the inside of the device 10 according to a user's puff. Also, in an embodiment, there may be a plurality of harvest devices 510, and the harvest devices 510 may be arranged at appropriate locations in the aerosol-generating device 10. The power conversion circuit 500 converts the power generated by the harvest device 510.

The power generated by the harvest device 510 may not be suitable to be directly applied to the aerosol-generating device 10. Therefore, the power conversion circuit 500 converts the power generated by the harvest device 510 into power that may be supplied to battery 200, the sensor 110, or the display 120 of the aerosol-generating device 10. The power conversion circuit 500 may include a rectifier circuit configured to rectify alternating current (AC) power into direct current (DC) power, a DC conversion circuit configured to adjust the rectified DC power to a power level suitable for the device 10, and a power storage device configured to temporarily store the DC power. A detailed configuration of the power conversion circuit 500 is described with reference to FIG. 6.

The controller 400 may control the power conversion circuit 500 to maximize output power of the harvest device 510. In general, an output voltage of the harvest device 510 may differ according to an energy source of the harvest device 510, element materials, designs, or the like. In the case of the thermoelectric device, for example, as a temperature difference increases, a greater amount of energy may be produced according to a Seebeck effect for changing a temperature difference to a potential difference. In this case, the power density may be about 50 mW/cm$^3$ to about 500 mW/cm$^3$, and the efficiency may be about 0.1% to about 10%. A piezoelectric device uses dielectric polarization in which positive and negative electric charges are divided by vibration or movements. Specifically, as the electric charge density of a surface changes according to the application of pressure, electricity starts flowing, thereby generating energy. In this case, the power density may be about 0.001 W/cm$^3$ to about 90 W/cm$^3$, and the efficiency is about 25% and about 60%. In an embodiment, the controller 400 may output a switching control signal to the power conversion circuit 500 based on types of the harvest device 510, an operation state of the aerosol-generating device 10 such that the output power of the harvest device 510 to be maximized. Examples of the operation state of the aerosol-generating device 10 may include an operation cycle of the device 10, a heating cycle (e.g., a pulse width modulation (PWM) duty ratio), a heating profile of a heater, a user's puffs detected by a puff sensor (or a pressure sensor), a puff cycle, a puff intensity, or the like.

The charging control circuit 210 transmits, to the battery 200, DC power output from the power conversion circuit 500.

The charging control circuit 210 controls the charging of the battery 200 by supplying the DC power output from the power conversion circuit 500 in the form of a constant current or a constant voltage to meet the specifications (e.g., a charging current and a charging voltage) of the battery 200 of the aerosol-generating device 10. The controller 400 may control the charging control circuit 210 to supply the power generated by the harvest device 510 to the battery 200, thus driving the heater 100.

For example, when the aerosol-generating device 10 stops operating or is in an inactive mode (that is, when the battery 200 is not in use), or when the harvest device 510 may generate the power as much as possible, the controller 400 may charge the battery 200 with the power generated by the harvest device 510. Therefore, a use time of the battery 200 recharged once, for example, the number of cigarettes that may be smoked when the battery 200 is recharged once, may increase from 20 to at least 21. Also, the controller 400 may monitor a voltage of the battery 200 and when the battery 200 is over-discharged, the controller 400 may control the charging control circuit 210 to recharge the battery 200 with the power generated by the harvest device 510.

For example, when the cigarette is inserted into the aerosol-generating device 10, the aerosol-generating device 10 may calculate the remaining amount of the battery for heating a cigarette. When the battery power is not enough for the user to smoke one cigarette (e.g., 14 puffs or 3 minutes), the aerosol-generating device 10 may not operate. Thus, the user may not be able to smoke until the aerosol-generating device 10 is connected to a charger. According to an embodiment, when the remaining power of the battery 200 is not enough for the user to smoke one cigarette, the controller 400 may control the charging control circuit 210 to recharge the battery 200 with DC power that is converted by and/or temporarily stored in the power conversion circuit 500. Therefore, it is possible to reduce the inconvenience of the user not being able to use the device 10 when the user wants to. The sensor 110 may include a puff sensor for detecting the user's puffs, a detection sensor (e.g., an inductive sensor) for detecting the cigarette insertion, a gradient sensor for detecting a movement, a gyroscope sensor, a temperature sensor, a humidity sensor, and the like.

The sensor 110 may be provided in plural and further include a sensor controller (not illustrated) for controlling each sensor 110. The controller 400 controls the sensor 110 and receives a sensor signal output by the sensor 110, thereby controlling a relevant operation of the aerosol-generating device 10. In an embodiment, a power supply terminal VDD of the sensor 110 is connected to an output terminal of the power conversion circuit 500 and supplies power required to drive the sensor 110. The controller 400 may control the power conversion circuit 500 to maximize the output power of the harvest device 510, based on the sensing cycle or sensing conditions of the sensor 110. For example, the controller 400 may maximally control produced power of a thermoelectric device according to a temperature difference, based on a temperature of the heater 100 that is detected by the temperature sensor, and may maximally control produced power of a fan device based on the user's puffs detected by a pressure sensor. Also, the controller 400 may transmit the power, which is generated by the harvest device 510, to other components such as the sensor 110 or the battery 200, according to the operation cycle of the sensor 110 or when necessary.

The display 120 may output state information of the device 10. The display 120 may be a liquid crystal display (LCD) panel, a light-emitting diode (LED) panel, or an organic light-emitting diode (OLED) panel, and may further include a display driving circuit (not illustrated). A power supply terminal VDD of the display 120 or the display driving circuit (not illustrated) may be connected to the output terminal of the power conversion circuit 500, and power required to drive the display 120 may be supplied according to the control of the controller 400.

FIG. 6 is an exemplary block diagram of the power conversion circuit 500 of FIG. 5. Referring to FIG. 6, the power conversion circuit 500 may include a rectifier circuit 600, a DC conversion circuit 610, and a power storage device 620.

The rectifier circuit 600 converts the AC power, which is generated by the harvest device 510, into first DC power.

The rectifier circuit 600 performs a function of converting AC power, which is generated by the harvest device 510, into DC power. The rectifier circuit 600 may be a half-wave rectifier or a full-wave rectifier. For example, the rectifier circuit 600 may be a full-bridge circuit including four switches, a full-bridge circuit including four diodes, or a full-bridge circuit including two diodes and two switches, but the rectifier circuit 600 is not limited thereto. The DC conversion circuit 610 converts the first DC power, which is output from the rectifier circuit 600, into second DC power of a certain level.

The DC conversion circuit 610 includes a DC-DC converter and a voltage regulator circuit. The DC conversion circuit 610 converts DC power into a battery charging voltage (e.g., about 5 V), a sensor VDD voltage (e.g., from about 1.7 V to about 3.6 V), or a display VDD voltage (e.g., about 3.3 V) of the device 10. The power storage device 620 temporarily stores the second DC power.

The power storage device 620 may include at least one of a lithium-ion battery (LiB), a rechargeable thin film solid battery (SSB) capacitor, and a super capacitor, but is not limited thereto. The power storage device 620 may be of various types. In an embodiment, the rectifier circuit 600 may rectify or perform DC-conversion on the power generated by the harvest device 510, and immediately supply the DC power to the battery 200, the sensor 110, or the display 120. Alternatively, the rectifier circuit 600 may store the power in the power storage device 620 and supply the stored power to the battery 200, the sensor 110, or the display 120 when necessary, according to the control of the controller 400. FIG. 7 is another exemplary block diagram of the power conversion circuit 500 of FIG. 5.

FIG. 7 illustrates a power conversion circuit connected to the harvest device 510.

The power conversion circuit includes a rectifier circuit 700 and a DC-DC converter 710. The rectifier circuit 700 may include a full-bridge circuit including four switches Q1 to Q4, a diode D, a capacitor C1, and a switch Qs connected between the harvest device 510 and the full-bridge circuit. The controller 400 controls the switch Qs to maximize an output from the harvest device 510.

The controller 400 may turn on the switch Qs at a zero-crossing point, at which a current direction of the AC power generated by the harvest device 510 is changed, to short the output terminals of the harvest device 510. Then, electric charges stored in an internal capacitor (not illustrated) of the harvest device 510 may be instantaneously discharged to an input of the full-bridge circuit of the rectifier circuit 700. Therefore, the consumption (or loss) of energy required to store the power, which is generated by the harvest device 510, in the internal capacitor and to discharge the same may be reduced, and output power of the rectifier circuit 700 may increase. When the power charged to the internal capacitor is entirely transmitted to the rectifier circuit 700, the controller 400 may turn off the switch Qs again to store the power generated by the harvest device 510 in the internal capacitor. Then, the switch Qs is turned on again when a current direction of the power generated by the harvest device 510 is changed.

In an embodiment, the controller 400 may determine a power generation characteristic (i.e., a point in time when a current direction of AC power is changed) of each harvest device 510 based on the operation of the device 10, such as a temperature change according to the heating of a heater, a pressure change according to puffs, or a change in the amount of external air according to puffs, and may perform zero-crossing switching control to maximally transmit the power, which is generated by the harvest device 510, to the rectifier circuit 700.

The AC power generated by the harvest device 510 is input to the full-bridge circuit including four switches Q1 to Q4, and the AC power is rectified to the DC power.

Each of the switches Q1 to Q4 may be a Metal Oxide Semiconductor Field Effect Transistor (MOSFET) device (hereinafter, referred to as a MOSFET) including a gate electrode G, a drain electrode D, and a source electrode S. When an N-type transistor (NMOS) is used as a switch, the switch is turned on according to a gate voltage having a high level and turned off according to a gate voltage having a low level. When a P-type transistor (PMOS) is used as a switch, the switch is turned off according to a gate voltage having a high level and turned on according to a gate voltage having a low level. The power rectified in the full-bridge circuit is smoothed again by the capacitor C1.

The capacitor C1 is used as a low-pass filter for decreasing a pulsating current (i.e., removing a ripple) included in an output voltage of the full-bridge circuit. The diode D performs a function of fully transmitting the power rectified by the full-bridge circuit and smoothed by the capacitor C1 to the DC-DC converter 710.

The DC-DC converter 710 adjusts the DC power from the rectifier circuit 700 to a certain level.

The DC-DC converter 710 boosts or converts the DC power to a DC voltage suitable for the aerosol-generating device 10. For example, the DC power is converted into a battery charging voltage (e.g., about 5 V), a sensor VDD voltage (e.g., about 1.7 V to about 3.6 V), and a display VDD voltage (e.g., about 3.3 V). FIG. 9 is an exemplary block diagram of the DC-DC converter 710 of FIG. 7.

Referring to FIG. 9, a DC-DC converter 910 may be a synchronous DC-DC boost converter, and a range of an input voltage Vin may be about 2.3 V to about 6.0 V, and a range of an output voltage Vout may be about 5.0 V.

The input terminal is connected to an output terminal of the rectifier circuit 700, and the output terminal is connected to the charging control circuit 210 of FIG. 5, the power storage circuit 620 of FIG. 6, the sensor 110, or the power supply terminal VDD of the display 120. In an embodiment, the DC power output from the rectifier circuit 700 is converted into DC power having a certain level, e.g., a voltage of about 5 V, by the DC-DC converter 910, and the converted DC power may be used by the battery or other components of the aerosol-generating device 10.

It is described that the DC power is converted into the DC power having a voltage of about 5 V, but one or more embodiments are not limited thereto. The DC power may have various input voltage ranges or output voltage ranges by adjusting values and arrangements of a resistor, a capacitor, and an inductor of FIG. 9. A programmable input current limitation function may be performed by a resistor $R_{ILIM}$ connected to an input terminal of a main chip 900 of the DC-DC converter 910.

For example, the current accuracy may be about ±20% in 500 mA in the total temperature range, and the input current may be programmable in a range of about 100 mA to about 1500 mA.

FIG. 8 is another exemplary block diagram of the power conversion circuit 500 of FIG. 5.

FIG. 8 illustrates a power conversion circuit connected to the harvest device 510.

The power conversion circuit may include a rectifier circuit 800 and a voltage regulator circuit 810. The rectifier circuit 800 may include a full-bridge circuit including four diodes D1 to D4, and a capacitor C2. The AC power, which is generated by the harvest device 510, is input to the full-bridge circuit including four diodes D1 to D4, and thus an AC may be rectified into a DC.

The DC power rectified in the full-bridge circuit is further smoothed by the capacitor C2. The capacitor C2 is used as a low-pass filter for reducing a pulsating current (i.e., removing a ripple) included in an output voltage of the full-bridge circuit. The voltage regulator circuit 810 adjusts the DC power, which is output from the rectifier circuit 800, to a certain level.

The voltage regulator circuit 810 boosts or converts the DC power to a DC voltage having a level suitable for the aerosol-generating device 10. For example, the DC power is converted into a battery charging voltage (e.g., 5 V), a sensor VDD voltage (e.g., about 1.7 V to about 3.6 V), and a display VDD voltage (e.g., about 3.3 V). FIG. 10 is another exemplary block diagram of the voltage regulator circuit 810 of FIG. 8.

FIG. 10 illustrates a Low Dropout (LDO) regulator 1010, and an LDO regulator may be generally used when an input voltage is very close to an output voltage.

An input terminal of the LDO regulator 1010 is connected to an output terminal of the rectifier circuit 800, and an output terminal of the LDO regulator 1010 is connected to the charging control circuit 210 of FIG. 5, the power storage circuit 620 of FIG. 6, the sensor 110, or the power supply side VDD of the display 120. An input voltage Vin of the LDO regulator 1010 may be about 6 V, and an output voltage Vout of the LDO regulator 1010 may be about 5 V.

However, one or more embodiments are not limited thereto. A circuit design may be in various input voltage ranges and output voltage ranges. FIG. 11 is a block diagram of an aerosol-generating device according to another embodiment.

Referring to FIG. 11, the aerosol-generating device 10 includes a plurality of sensors 111 to 113.

The sensors 111 to 113 may include a pressure sensor or a puff sensor for detecting the user's puffs, a detection sensor for detecting the cigarette insertion (e.g., an inductive sensor, a capacitor sensor, a proximity sensor, or an IR sensor), a temperature sensor for detecting a temperature of a heater, a gradient sensor, a gyroscope sensor, or the like. The output terminal of the power conversion circuit 500 is connected to a power supply terminal of each of the sensors 111 to 113.

Also, a first switch S1 between the power conversion circuit 500 and the sensor 1 111, a second switch S1 between the power conversion circuit 500 and the sensor 2 112, and a third switch S3 between the power conversion circuit 500 and the sensor N 113 are added. The controller 400 may control the first to third switches S1 to S3 and may selectively transmit the power generated by the harvest device 510 to the sensors 111 to 113. In an embodiment, the controller 400 may selectively transmit the power to the sensors 111 to 113 by considering the amount of DC power converted by the DC conversion circuit 610 of the power conversion circuit 500 or the amount of DC power stored in the power storage device 620, priorities of the sensors 111 to 113, and the like.

FIG. 12 is a block diagram of an aerosol-generating device according to another embodiment.

Referring to FIG. 12, the aerosol-generating device 10 includes the charging control circuit 210, the battery 200, the heater 100, the sensor 110, and the display 120.

The output terminal of the power conversion circuit 500 is connected to each of the charging control circuit 210, the sensor 110, and the display 120.

The aerosol-generating device 10 includes a fourth switch S4 between the output terminal of the power conversion circuit 500 and the charging control circuit 210, a fifth switch S5 between the output terminal of the power conversion circuit 500 and the sensor 110, and a sixth switch S6 between the output terminal of the power conversion circuit 500 and the display 120. The controller 400 may control the fourth to sixth switches S4 to S6 and may selectively transmit the power generated by the harvest device 510 to the battery 200, the sensor 110, or the display 120.

In an embodiment, the controller 400 may selectively transmit the power to the battery 200, the sensor 110, or the display 120 by considering the amount of DC power converted by the DC conversion circuit 610 of the power conversion circuit 500, the amount of DC power stored in the power storage device 620, or the charging amount of the battery 200.

For example, when the charging amount of the battery 200 is equal to or greater than a threshold value, the controller 400 may supply the power to the sensor 110 by turning off the fourth switch S4 and turning on the fifth switch S5. Also, when it is unnecessary to supply power to the sensor 110 while the aerosol-generating device 10 is off, the controller 400 may supply the power to the display 120 by turning on the sixth switch S6, and thus the Always on Display function of the display 120 may be implemented. Here, the Always on Display function is a feature that turns on a screen all the time and lets a device show information (e.g., the time, a remaining amount of battery power, etc.) in a limited portion or region of the screen in a power-off mode or a sleep mode. FIG. 13 is a block diagram of an aerosol-generating device according to another embodiment.

Referring to FIG. 13, the aerosol-generating device 10 includes a plurality of harvest devices 511 to 513, and an output terminal of each of the harvest devices 511 to 513 is connected to the power conversion circuit 500.

The harvest devices 511 to 513 may include a piezoelectric device, a thermoelectric device, a photoelectric device, an electromagnetic device, and/or a rotation fan-type device. A seventh switch S7 is connected between the first harvest device 511 and the power conversion circuit 500, an eighth switch S8 is connected between the second harvest device 512 and the power conversion circuit 500, and a ninth switch S9 is connected between an N$^{th}$ harvest device 513 and the power conversion circuit 500.

The controller 400 may control the seventh to ninth switches S7 to S9 to selectively generate power from the harvest devices 511 to 513 and transmit the power to the power conversion circuit 500.

The controller 400 may determine a current operation state of the aerosol-generating device 10, such as the heating of the heater, a halt, the user's puffs, and the like, and may selectively drive one or more of the harvest devices 511 to 513 accordingly.

For example, while the heater is being heated, the seventh switch S7 is turned on to transmit the power generated by the harvest device 511 to the power conversion circuit 500. In this case, the loss in the harvest device 511 is reduced by controlling one or more switches in the power conversion circuit 500 such that maximum output power may be obtained from the power conversion circuit 500. Also, the controller 400 may transmit, to the power conversion circuit 500, the power generated by the harvest devices 511-513. In this case, the controller 400 may transmit the power respectively to the power conversion circuit 500 by sequentially turning on the seventh to ninth switches S7-S9. Also, the controller 400 may simultaneously turn on the seventh to ninth switches S7-S9 such that the aggregated power may be transmitted to the power conversion circuit 500.

In an embodiment, a plurality of power conversion circuits may be respectively connected to the harvest devices 511 to 513, and each power conversion circuit may convert power transmitted from the corresponding harvest device.

FIGS. 14A and 14B are block diagrams of an aerosol-generating device according to another embodiment.

Referring to FIG. 14A, the aerosol-generating device 10 includes a cartridge 1400, the controller 400, and the battery 200.

Here, the cartridge 1400 may be detachable from a main body including the controller 400 and the battery 200. When the cartridge 1400 is coupled to the main body, the cartridge 1400 may receive power from the battery 200 of the main body through contact terminals 1410 and 1420 and receive a control signal from the controller 400. The cartridge 1400 may include a coil heater and/or an ultrasonic atomizer, and may generate an aerosol by heating a liquid composition. The aerosol generated by heating the liquid composition may be inhaled by the user.

FIG. 14B illustrates an enlarged region A of FIG. 14A.

An airflow passage 1460 may be configured such that air may be introduced from the outside to the inside of the aerosol-generating device 10. The outside air may flow into the airflow passage 1460 according to the user's puffs. The airflow may pass through the airflow passage 1460 and may be transmitted to the user together with the aerosol generated by the coil heater or the vaporizer of the cartridge 1400. The outside air may flow into the airflow passage 1460 through a gap formed between the main body and the cartridge 1400, but the arrangement of the airflow passage 1460 is not limited thereto.

A rotation fan 1450 may rotate according to the airflow and generate power.

The rotation fan 1450 may rotate according to the airflow and convert rotation energy into electrical energy. The rotation fan 1450 may be arranged in the airflow passage 1460 and may use the air flowing in the airflow passage 1460 to generate power by the rotation. The rotation fan 1450 may be arranged prior to the pressure sensor 1430 in terms of the airflow direction (i.e., the rotation fan 1450 may be arranged to meet the outside air flowing in according to a user's puff before the pressure sensor 1430). The rotation fan 1450 may be electrically connected to the controller 400 through a lead wire 1440 and transmit the generated power to the controller 400.

The aerosol-generating device 10 or the controller 400 may further include the power conversion circuit and other components described with reference to FIGS. 5 to 13.

The controller 400 may be electrically connected to the rotation fan 1450 to rectify the generated power into DC power, adjust the rectified DC power to a certain level, and supply the adjusted DC power to the battery or other components. While this disclosure has been particularly shown and described with reference to embodiments thereof, it will be understood by those skilled in the art that various changes in form and details may be made therein without departing from the spirit and scope of the disclosure as defined by the appended claims.

The embodiments should be considered in descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. An aerosol-generating device comprising:
a heating element configured to heat an aerosol-generating substrate;
a battery configured to supply power to the heating element;
a harvest device configured to generate power; and
a controller configured to control conversion of power generated by the harvest device and control charging of the battery by using converted power,
wherein the controller is further configured to determine a power generation characteristic of the harvest device based on an operation of the aerosol-generating device and to perform zero-crossing switching control to maximize transmission of the power generated by the harvest device.

2. The aerosol-generating device of claim 1, further comprising:
a power conversion circuit configured to convert the power generated by the harvest device; and
a charging control circuit connected to the power conversion circuit and configured to control the charging of the battery,
wherein the controller is further configured to apply a first control signal to the charging control circuit when the power is generated by the harvest device, and
the charging control circuit is further configured to transmit the converted power to the battery in response to the applied first control signal.

3. The aerosol-generating device of claim 2, further comprising: a puff sensor configured to detect a user's puff; and a detection sensor configured to detect insertion of a cigarette, wherein a power supply terminal of each of the puff sensor and the detection sensor is connected to an output terminal of the power conversion circuit.

4. The aerosol-generating device of claim 2, further comprising:
a display configured to output state information of the aerosol-generating device; and
a driving circuit configured to drive the display,
wherein a power supply terminal of the driving circuit is directly connected to an output terminal of the power conversion circuit.

5. The aerosol-generating device of claim 2, further comprising: a plurality of sensors; and
a plurality of switches respectively connected between power supply terminals of the plurality of sensors and an output terminal of the power conversion circuit,
wherein the controller is further configured to control the plurality of switches such that power is selectively supplied to at least one of the plurality of sensors.

6. The aerosol-generating device of claim 2, further comprising:
a sensor;
a display;
a fourth switch connected between the power conversion circuit and the charging control circuit;
a fifth switch connected between the power conversion circuit and the sensor; and
a sixth switch connected between the power conversion circuit and the display,
wherein the controller is further configured to control the fourth to sixth switches such that power is selectively supplied to at least one of the battery, the sensor, and the display.

7. The aerosol-generating device of claim 2, wherein the harvest device is provided in a plural number, and the aerosol-generating device further comprises:
a seventh switch connected between a first harvest device and the power conversion circuit; and
an eighth switch connected between a second harvest device and the power conversion circuit,
wherein the controller is further configured to control the seventh switch and the eighth switch such that power is generated by at least one of the first harvest device and the second harvest device is transmitted to the power conversion circuit.

8. The aerosol-generating device of claim 1, further comprising:
a rectifier circuit configured to convert alternating current (AC) power, which is generated by the harvest device, into first direct current (DC) power;
a DC conversion circuit configured to convert the first DC power output from the rectifier circuit into second DC power having a certain level; and
a power storage device configured to temporarily store the second DC power.

9. The aerosol-generating device of claim 8, wherein the rectifier circuit comprises:
a first switch connected in parallel with the harvest device;
a first full-bridge circuit comprising four switches connected to the first switch;
a first capacitor connected in parallel with the first full-bridge circuit; and
a diode connected between the first full-bridge circuit and the first capacitor, and
wherein the controller is further configured to output a control signal for controlling such that the power generated by the harvest device is transmitted to the first full-bridge circuit.

10. The aerosol-generating device of claim 8, wherein the DC conversion circuit comprises a DC-DC converter connected to an output terminal of the rectifier circuit, and a voltage of the second DC power is about 5 V.

11. The aerosol-generating device of claim 8, wherein the rectifier circuit comprises:
a second full-bridge circuit comprising four diodes connected to the harvest device; and
a second capacitor connected in parallel with the second full-bridge circuit.

12. The aerosol-generating device of claim 11, wherein the DC conversion circuit comprises a voltage regulator circuit connected to an output terminal of the rectifier circuit, and a voltage of the second DC power is about 5 V.

13. The aerosol-generating device of claim 1, further comprising a charging control circuit configured to control the charging of the battery,
wherein the controller is further configured to apply a second control signal to the charging control circuit when a voltage of the battery is less than or equal to a first threshold voltage, and the charging control circuit is further configured to supply second DC power, which is temporarily stored in a power storage device, to the battery in response to the second control signal.

14. The aerosol-generating device of claim 1, wherein the harvest device comprises at least one of a piezoelectric device, a thermoelectric device, a photoelectric device, and an electromagnetic device.

15. The aerosol-generating device of claim 1, wherein the operation of the aerosol-generating device includes at least one of temperature change based on the heating of the heater, a pressure change based on user's puffs, and a change in the amount of external air based on the user's puffs.

16. The aerosol-generating device of claim 15, further comprises a rectifier circuit configured to convert alternating current (AC) power, which is generated by the harvest device, into first direct current (DC) power, wherein the controller is further configured to perform zero-crossing switching control to maximize transmission of the alternating current (AC) power generated by the harvest device to the rectifier circuit.

17. An aerosol-generating device comprising:

a heating element configured to heat an aerosol-generating substrate;

a battery configured to supply power to the heating element;

a harvest device configured to generate power; and a controller configured to control conversion of power generated by the harvest device and control charging of the battery by using converted power, wherein the harvest device comprises a rotation fan arranged in an airflow passage through which external air is introduced inside the aerosol-generating device according to a user's puff.

\* \* \* \* \*